United States Patent Office 2,776,280
Patented Jan. 1, 1957

2,776,280

OPTICAL SENSITIZING DYES CONTAINING A N-CARBAMYLMETHYL GROUP

Leslie G. S. Brooker and Donald W. Heseltine, Rochester, N. Y., assignors to Eastman Kodak Company, Rochester, N. Y., a corporation of New Jersey No Drawing. Application October 14, 1954,
Serial No. 462,392

12 Claims. (Cl. 260—240.6)

This invention relates to cyanine dyes and methods for making them. More particularly, this invention relates to cyanine dyes containing at least one N-carbamylmethyl group and photographic emulsions containing these new dyes.

Accordingly, it is an object of our invention to provide new cyanine dyes containing a N-carbamylmethyl group. Another object is to provide methods for making these new cyanine dyes. Still another object is to provide new intermediates for preparing these new dyes, as well as a method for making these new intermediates. Another object is to provide photographic emulsions sensitized with these new cyanine dyes. Other objects will become apparent from a consideration of the following description and examples.

The dyes of our invention can advantageously be represented by the following general formula:

I
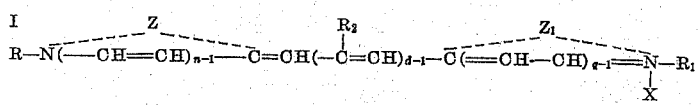

wherein R and R₁ each represents an alkyl group, such as methyl, ethyl, n-propyl, isopropyl, n-butyl, isobutyl, n-amyl, carboxymethyl, β-carboxyethyl, carbomethoxymethyl, carbethoxymethyl, β-hydroxyethyl, β-methoxyethyl, allyl (vinylmethyl), benzyl (phenylmethyl), carbamylmethyl (e. g., carbamylmethyl, dimethylcarbamylmethyl, diethylcarbamylmethyl, etc.), etc., provided that at least R or R₁ is a carbamylmethyl group, R₂ represents a hydrogen atom or a lower alkyl group (e. g., methyl, ethyl, etc.), X represents an acid radical, such as chloride, bromide, iodide, perchlorate, thiocyanate, benzenesulfonate, p-toluenesulfonate, methylsulfate, ethylsulfate, etc., d, n, and q each represents a positive integer of from 1 to 2, and Z and Z₁ each represents the non-metallic atoms necessary to complete a heterocyclic nucleus containing 5 atoms in the heterocyclic ring or 6 atoms in the heterocyclic ring, such as those selected from the group consisting of those of the thiazole series (e. g., thiazole, 4-methylthiazole, 5-methylthiazole, 4-phenylthiazole, 5-phenylthiazole, 4,5-dimethylthiazole, 4,5-diphenylthiazole, 4-(2-thienyl)-thiazole, etc.), those of the benzothiazole series (e. g., benzothiazole, 4-methylbenzothiazole, 5-methylbenzothiazole, 6-methylbenzothiazole, 4-phenylbenzothiazole, 5-phenylbenzothiazole, 4-methoxybenzothiazole, 5-methoxybenzothiazole, 6-methoxybenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e. g., α-naphthothiazole (i. e., [2,1]-naphthothiazole), β-naphthothiazole (i. e., [1,2]-naphthothiazole), 5-methoxy-β-naphthothiazole, 5-ethoxy-β-naphthothiazole, 7-methoxy-α-naphthothiazole, 8-methoxy-α-naphthothiazole, etc.), those of the thianaphtheno-7′,6′,4,5-thiazole series (e. g., 4′-methoxythianaphtheno-7′,6′,4,5-thiazole, etc.), those of the oxazole series (e. g., 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e. g., benzoxazole, 5-phenylbenzoxazole, 5-methylbenzoxazole, 6-methylbenzoxazole, 5,6-dimethylbenzoxazole, 4,6-dimethylbenzoxazole, 5-methoxybenzoxazole, 6-methoxybenzoxazole, 5-ethoxybenzoxazole, 5-hydroxybenzoxazole, 6-hydroxybenzoxazole, etc.), those of the naphthoxazole series (e. g., α-naphthoxazole, β-naphthoxazole, etc.), those of the selenazole series (e. g., 4-methylselenazole, 4-phenylselenazole, etc.), those of the benzoselenazole series (e. g., benzoselenazole, 5-methoxybenzoselenazole, 5-hydroxybenzoselenazole, tetrahydrobenzoselenazole, etc.), those of the naphthoselenazole series (e. g., α-naphthoselenazole, β-naphthoselenazole, etc.), those of the thiazoline series (e. g., thiazoline, 4-methylthiazoline, etc.), those of the 2-quinoline series (e. g., quinoline, 3-methylquinoline, 5-methylquinoline, 7-methylquinoline, 8-methylquinoline, 6-methoxyquinoline, 6-ethoxyquinoline, 6-hydroxyquinoline, 8-hydroxyquinoline, etc.), those of the 2-quinoline series (e. g., quinoline, 6-methoxyquinoline, 7-methylquinoline, 8-methylquinoline, etc.), those of the 1-isoquinoline series (e. g., isoquinoline, 3,4-dihydroisoquinoline, etc.), those of the 3-isoquinoline series (e. g., isoquinoline, etc.), those of the 3,3-dialkylindolenine series (e. g., 3,3-dimethylindolenine, 3,3,5-trimethylindolenine, 3,3,7-trimethylindolenine, etc.), those of the 2-pyridine series (e. g., pyridine, 3-methylpyridine, 4-methylpyridine, 5-methylpyridine, 6-methylpyridine, 3,4-dimethylpyridine, 3,5-dimethylpyridine, 3,6-dimethylpyridine, 4,5-dimethylpyridine, 4,6-dimethylpyridine, 3-hydroxypyridine, 4-hydroxypyridine, 5-hydroxypyridine, 6-hydroxypyridine, 3-phenylpyridine, 4-phenylpyridine, 6-phenylpyridine, etc.), those of the 4-pyridine series (e. g., 2-methylpyridine, 3-methylpyridine, 2,3-dimethylpyridine, 2,5-dimethylpyridine, 2,6-dimethylpyridine, 2-hydroxypyridine, 3-hydroxypyridine, etc.), etc.

According to our invention, we provide the new dyes represented by Formula I above wherein d represents 2 and Z and Z₁ are identical (i. e., symmetrical carbocyanine dyes) by reacting together a cyclammonium quaternary salt selected from those represented by the following general formula:

II
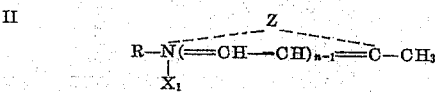

wherein R, n and Z each have the values given above, and X₁ represents an acid radical, such as those defined above for X, with an orthoester selected from those represented by the following general formula:

III (R′O)₃C—R₂ wherein R₂ has the values given above and R′ represents a lower alkyl group (e. g., methyl, ethyl, etc.). Alternatively, these symmetrical carbocyanine dyes wherein R₂ represents a hydrogen atom can be prepared by condensing together an intermediate selected from those represented by Formula II above with a dialkoxymethyl carboxylate, such as diethoxymethyl acetate, which process is described in Dent and Brooker U. S. Patent 2,537,-880, issued January 9, 1951.

The new dyes of our invention represented by Formula I above wherein d is 2 and Z and Z₁ are different from one another (i. e., unsymmetrical carbocyanine dyes), and wherein $R_2$ is a hydrogen atom, can be prepared by condensing a cyclammonium quaternary salt selected from those represented by Formula II above with an intermediate selected from those represented by the following general formula:

IV 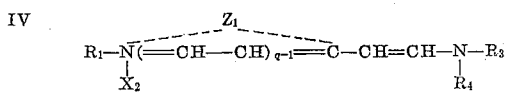

wherein $R_1$, $q$, and $Z_1$ each have the values given above, $R_3$ represents a carboxylic acyl group, such as acetyl, propionyl, butyryl, isobutyryl, benzoyl, etc. (e. g., a carboxylic acyl group containing from 2 to 7 carbon atoms), $R_4$ represents an aromatic group, such as phenyl, o-, m- and p-tolyl, etc. (e. g., a mononuclear aromatic group containing from 6 to 7 carbon atoms), and $X_2$ represents an acid radical, such as those listed above for X. Unsymmetrical carbocyanine dyes wherein $R_2$ is an alkyl group can be prepared according to the method described in Kodak British Patent 533,425, accepted February 13, 1941.

The new dyes of our invention represented by Formula I above wherein $d$ represents 1 (i. e., simple cyanine dyes) can be prepared by condensing a cyclammonium quaternary salt selected from those represented by Formula II, above with a cyclammonium quaternary salt selected from those represented by the following general formula:

V 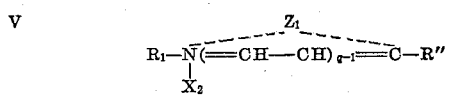

where $R_1$, $q$, $X_2$ and $Z_1$ each have the values given above, and $R''$ represents a halogen atoms, such as iodine, or an alkyl- or arylmercapto group (e. g., methylmercapto, ethylmercapto, phenylmercapto, etc.).

The condensations of the compounds of Formula II with those of Formulas III, IV and V can advantageously be accelerated by heating the reaction mixture, generally temperatures varying from room temperature (about 25° C.) to the reflux temperature of the reaction mixture being satisfactory. The condensations can be carried out in the presence of an inert diluent, such as pyridine, nitrobenzene, ethanol, n-propanol, isopropanol, n-butanol, etc.

The condensations of the compounds of Formula II with those of Formulas IV and V can advantageously be carried out in the presence of a basic condensing agent, such as the trialkylamines (e. g., triethylamine, tripropylamine, triisopropylamine, tributylamine, triisobutylamine, triamylamine), N-alkylpiperidines (e. g., N-methylpiperidine, N-ethylpiperidine, etc.), N,N-dialkylanilines (e. g., N,N-dimethylaniline, N,N-diethylaniline, etc.), etc.

We have also found that the intermediates selected from those represented by Formula II above can be condensed together with a compound selected from those represented by Formula III and a compound selected from those represented by the following general formula:

VI 

wherein Q represents the non-metallic atoms necessary to complete a heterocyclic nucleus containing from 5 to 6 atoms in the heterocyclic ring (as defined in column 3, line 57–column 4, line 60, of U. S. Patent 2,666,761, issued January 19, 1954) to give merocarbocyanine dyes. Alternatively, these merocarbocyanine dyes can be produced by condensing together a compound selected from those represented by Formula IV above with a compound selected from those represented by Formula VI above.

We have also found that dicarbocyanine and tricarbocyanine dyes containing a N-carbamylmethyl group can be prepared by condensing a compound selected from those represented by Formula II above with β-anilinoacroleinanilhydrochloride (Hamer U. S. Patent 2,218,450) and glutaconicaldehydedianilide hydrochloride (Brooker U. S. Patent 2,161,332, issued June 6, 1939), respectively.

We have found that tetracarbocyanine dyes containing a N-carbamylmethyl group can be prepared by condensing a compound selected from those represented by Formula II above together with piperylenedialdehydedi-trahydroquinalide iodide in the presence of a basic condensing agent, such as the trialkylamines listed above. These condensations are preferably carried out in the presence of an inert diluent, such as acetic anhydride (Dieterle et al., "Z. w. P.," vol. 36, pp. 68, 141).

The intermediates selected from those represented by Formula II above can advantageously be prepared by heating together a base selected from those represented by the following general formula:

VII 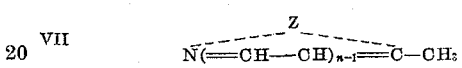

wherein Z and $n$ each have the values given above, with an amide selected from those represented by the following general formula:

VIII 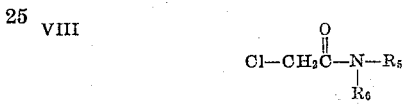

wherein $R_5$ and $R_6$ each represents a hydrogen atom or a lower alkyl group, such as methyl, ethyl, etc. (e. g., an alkyl group containing from 1 to 2 carbon atoms) to give compounds represented by the following general formula:

IX 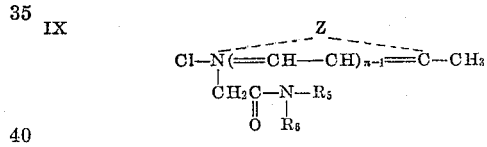

wherein $n$, Z, $R_5$ and $R_6$ each have the values given above. Heating is advantageously effected on a steam bath and is continued until quaternation is substantially complete. The chloride anion can be placed in the compounds of Formula IX according to the method described in Brooker U. S. Patent 2,245,249 or 2,245,250, both issued June 10, 1941, or by simply adding an aqueous solution of a salt, the anion of which produces a more insoluble derivative of the compound of Formula IX than the chloride derivative.

The following examples will serve to illustrate the manner whereby the new dyes of our invention can be prepared.

*Example 1.—3-diethylcarbamylmethyl-2-methylbenzothiazolium chloride*

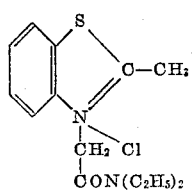

2-methylbenzothiazole (74.5 g., 1 mol.), chloroacetdiethylamide (74.5 g., 1 mol.), and sodium iodide (0.1 g.) were mixed and heated on the steam bath for ten days. The reaction mixture was then cooled and stirred with ether (500 ml.). The ether solution was decanted and the residue washed with ether. The sticky salt was then stirred with acetone (100 ml.), chilled, filtered, and dried. The product 24.2 g. (16 percent) was used without further purification. M. P. 231–2° C. dec. The quaternary iodide was prepared by adding sodium iodide to an aqueous solution of the chloride.

*Example 2.—3'-diethylcarbamylmethyl-3 - ethyloxathiacarbocyanine perchlorate*

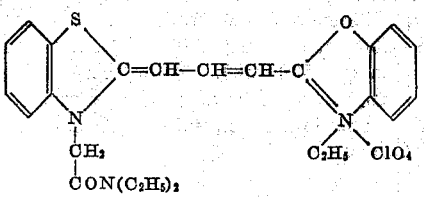

3-diethylcarbamylmethyl - 2 - methylbenzothiazolium iodide (1.5 g., 1 mol.), 2-β-acetanilidovinyl-3-ethylbenzoxazolium iodide (1.7 g., 1 mol.), and triethylamine (0.51 g., 1 mol. plus 30 percent excess) were heated under reflux in ethyl alcohol (20 ml.) for twenty minutes. The crude dye was precipitated by the addition of water (100 ml.). The aqueous solution was decanted and the residue dissolved in ethyl alcohol and precipitated by the addition of aqueous sodium perchlorate. The yield of crude dye was 1.03 g. (38 percent). After four recrystallizations from methyl alcohol, the yield of purified dye was 0.26 g. (9 percent). M. P. 151–3° C.

*Example 3.—3,3'-di(diethylcarbamylmethyl)-9-methyl-thiacarbocyanine iodide*

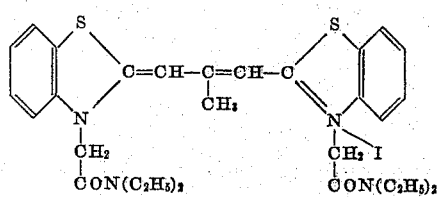

3-diethylcarbamylmethyl - 2 - methylbenzothiazolium chloride (2.99 g., 2 mol.) and ethylorthoacetate (3.24 g., 1 mol. plus 300 percent excess) were heated under reflux in pyridine (20 ml.) for one hour. The reaction mixture was chilled and the crude dye precipitated by the addition of sodium iodide (2 g.) in water (50 ml.). The crude product, 1.65 g. (49 percent), was filtered, washed with water, and ether, and dried. After two recrystallizations from methyl alcohol, the yield of purified dye was 1.05 g. (31 percent). M. P. 262–3° C. dec.

*Example 4.—3,3'-di(diethylcarbamylmethyl) - 9 - ethyl-thiacarbocyanine iodide*

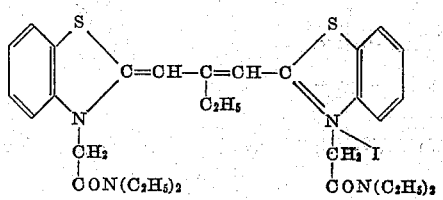

3-diethylcarbamylmethyl - 2 - methylbenzothiazolium chloride (3.0 g., 2 mol.) and ethylorthopropionate (3.52 g., 1 mol. plus 300 percent) were refluxed in pyridine (20 ml.) for thirty minutes. The reaction mixture was cooled and the crude dye converted to the iodide by the addition of sodium iodide (2 g.) in water (50 ml.). The crude dye (1.65 g., 48 percent) was filtered off, washed with water and ether and dried. After two recrystallizations from methyl alcohol, the yield of purified dye was 1.20 g. (35 percent). M. P. 257–8° C. dec.

*Example 5.—3-diethylcarbamylmethyl-1' - ethylthia - 2'-cyanine perchlorate*

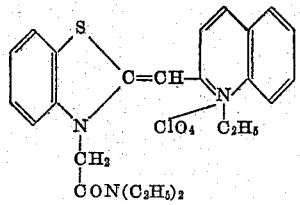

3 - diethylcarbamylmethyl - 2 - methylbenzothiazolium iodide (1.95 g., 1 mol.), 1-ethyl-2-phenylmercaptoquinolinium iodide (1.97 g., 1 mol.), and triethylamine (1.05 ml., 1 mol. plus 50 percent excess) were refluxed in ethyl alcohol (20 ml.) for one hour. The reaction mixture was cooled and the crude dye precipitated by the addition of ether (200 ml.) and then washed with additional ether. The dye iodide was dissolved in ethyl alcohol, converted to the perchlorate by the addition of aqueous sodium perchlorate and then filtered and dried. The yield of pure dye after four recrystallizations from methyl alcohol was 0.25 g. (10 percent). M. P. 226–7° C. dec.

*Example 6.—5-[(3-diethylcarbamylmethyl-2(3H) - benzothiazolylidene)-isopropylidene] - 3 - ethyl-2-thio-2,4-oxazolidinedione*

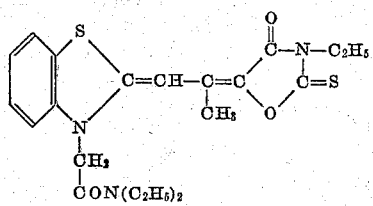

3-diethylcarbamylmethyl - 2 - methylbenzothiazolium chloride (2.99 g., 1 mol.), 3-ethyl-2-thio-2,4-oxazolidinedione (2.3 g., 1 mol. plus 50 percent excess), and ethylorthoacetate (3.2 g., 1 mol. plus 100 percent excess) were refluxed in pyridine (20 ml.) for one hour. The crude dye (1.37 g., 32 percent) was thrown out of solution by the addition of water (100 ml.), filtered, washed with water, and dried. After two recrystallizations from acetic acid, the yield of pure dye was 0.75 g. (17 percent). M. P. 242–3° C. dec.

*Example 7.—1 - diethylcarbamylmethyllepidinium chloride*

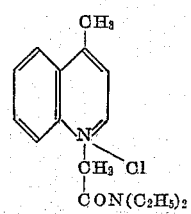

Lepidine (14.3 g., 1 mol.) and chloroacetdiethylamide (14.9 g., 1 mol.) were mixed and heated on the oil bath at 115–120° C. for thirty minutes. The reaction mixture was cooled and the crude product stirred with acetone, filtered, washed with acetone, and dried. This crude product (15.1 g., 52 percent) was used without further purification. A portion converted to the iodide by adding aqueous sodium iodide to an aqueous solution of the chloride melted at 212–13° C. dec.

*Example 8.—1,1'-di(diethylcarbamylmethyl)-4,4'-carbocyanine bromide*

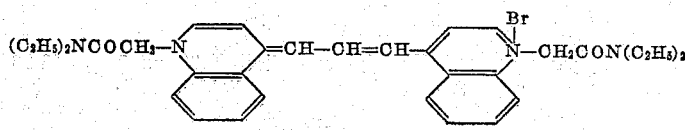

1-diethylcarbamylmethyllepidinium chloride (1.46 g., 2 mol.) and diethoxymethylacetate (1.62 g., 1 mol. plus 300 percent excess) were heated under reflux in pyridine (15 ml.) for twenty minutes. The reaction mixture was chilled and the crude product (1.15 g., 74 percent) precipitated by the addition of aqueous sodium bromide. The crude dye was filtered off, washed with water and acetone, and dried. After two recrystallizations from methyl alcohol, the yield of pure dye was 0.60 g. (39 percent). M. P. 270–1° C. dec.

*Example 9.—1,1' - di(diethylcarbamylmethyl)-10-methyl-4,4'-carbocyanine iodide*

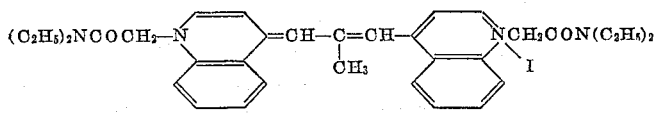

1-diethylcarbamylmethyllepidinium iodide (7.68 g., 2 mol.), ethylorthoacetate (3.24 g., 1 mol. plus 100 percent), and triethylamine (2.8 ml., 1 mol. plus 100 percent) were heated under reflux in acetic anhydride (25 ml.) for one hour. Reaction mixture was chilled, filtered, and the crude dye washed with water and acetone, and dried. After two recrystallizations from methyl alcohol, the yield of pure dye was 1.21 g. (18 percent). M. P. 195–6° C. dec.

*Example 10.—1' - diethylcarbamylmethyl-3-ethylthia - 4'-carbocyanine iodide*

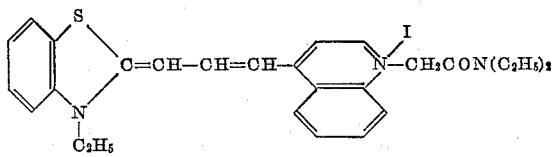

1-diethylcarbamylmethyllepidinium chloride (1.46 g., 1 mol.), 2-β-acetanilidovinyl-3-ethylbenzothiazolium iodide (2.25 g., 1 mol.), and triethylamine (0.51 g., 1 mol.) were heated under reflux in ethyl alcohol (20 ml.) for fifteen minutes. The reaction mixture was chilled, filtered, and the crude dye (1.55 g., 54 percent) was washed with water and acetone, and dried. After two recrystallizations from methyl alcohol, the yield of purified dye was 0.93 g. (33 percent). M. P. 253–4° C. dec.

*Example 11.—1,1' - di(diethylcarbamylmethyl) - 4,4'-tricarbocyanine bromide*

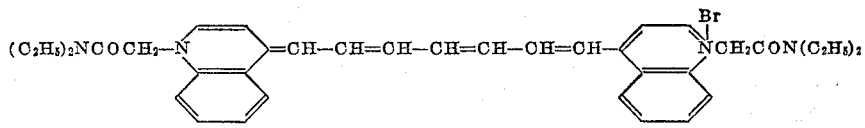

1-diethylcarbamylmethyllepidinium chloride (5.84 g., 2 mol.), glutaconicaldehydedianilide hydrochloride (2.85 g., 1 mol.), and piperidine (2 ml., 1 mol. plus 20 percent) were suspended in ethyl alcohol (25 ml.) and stirred at room temperature for thirty minutes. The reaction mixture was then filtered and the crude dye (1.65 g., 27 percent) was washed with water and ether and dried. After conversion to the bromide by the addition of aqueous sodium bromide and recrystallizing twice from methyl alcohol, the yield of pure dye was 0.51 g. (8 percent). M. P. 200–201° C. dec.

*Example 12.—1,1'-di(diethylcarbamylmethyl)-4,4'-tetracarbocyanine iodide*

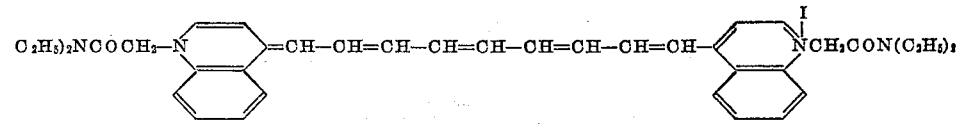

1-diethylcarbamylmethyllepidinium iodide (2.92 g., 2 mol. plus 100 percent excess), piperylenedialdehydeditetrahydroquinolide iodide (1.2 g., 1 mol.), acetic acid (1ml.), and triethylamine (3 ml.) were suspended in acetic anhydride (30 ml.) and stirred occasionally at room temperature for one hour. The reaction mixture was then filtered and the crude product washed with acetone (200 ml.), water (200 ml.), and finally with methyl alcohol (500 ml.). After recrystallizing from methyl alcohol, the yield of pure dye was 0.12 g. (7 percent). The bronze crystalline powder had M. P. 197–8° C. dec.

*Example 13.—3 - carbamylmethyl-1'-ethylthia-2'-cyanine iodide*

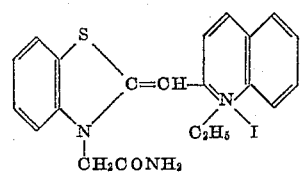

3 - carbamylmethyl - 2 - methylbenzothiazolium iodide (1.11 g.) (M. P. 249–50° C. dec.) and 2-iodoquinoline ethiodide (1.37 g.) were dissolved in absolute ethyl alcohol (20 cc.) in a 50 cc. flask. Triethylamine (0.34 g.) was added and the reaction mixture heated under reflux for 20 minutes. The reaction mixture was chilled, ether (100 cc.) added with stirring and the dye filtered off and twice recrystallized from methyl alcohol. Yield 0.35 g. 21%, M. P. 281–2° C. with decomposition.

*Example 14. — 3,3' - dicarbamylmethylthiacarbocyanine iodide*

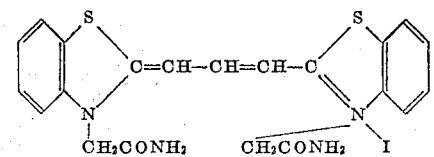

2 - carbamylmethyl - 2 - methylbenzothiazolium iodide 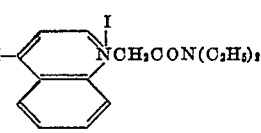 (2.50 g.) and diethoxymethyl acetate (1.62 g.) were dissolved in pyridine (25 cc.). The reaction mixture was heated under reflux for 20 minutes, chilled, the dye filtered off and washed well with water. The dye was twice recrystallized from methyl alcohol. Yield 0.18 g. 10%, M. P. 272–3° C. with decomposition.

*Example 15.—3' - carbamylmethyl-3-ethyl-oxa-thiacarbocyanine iodide*

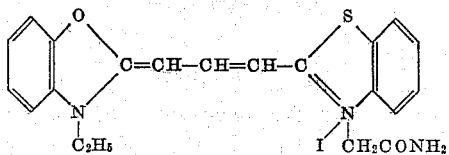

3 - carbamylmethyl - 2 - methylbenzothiazolium iodide (1.11 g.) and 2-β-acetanilidovinylbenzoxazole ethiodide (1.45 g.) were dissolved in absolute ethyl alcohol (25 cc.) in a 50 cc. flask. Triethylamine (0.34 g.) was added and the reaction mixture heated under reflux for 15 minutes. The reaction mixture was then chilled and ether (100 cc.) added with stirring. The ether layer was then decanted off and the residual dye washed with two 100 cc. portions of water. The dye was then twice recrystallized from methyl alcohol. Yield 0.58 g., 35%, M. P. 259–60° C. with decomposition.

This dye was a good sensitizer and it was easy to obtain in a pure state, unlike the 3,3'-diethyl dye which is difficult to obtain pure.

*Example 16.—1,1'-dicarbamylmethyl-4,4'-carbocyanine iodide*

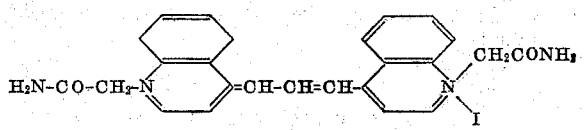

1-carbamylmethyllepidinium iodide (3.28 g.) (M. P. 236–8° C. dec.) and diethoxymethylacetate (1.62 g.) were dissolved in pyridine (30 cc.) and the reaction mixture heated under reflux for 20 minutes. The reaction mixture was then chilled, the dye filtered off and washed with water and acetone. The crude dye was twice recrystallized from cresol. Yield 0.24 g. 9%; M. P. 274–5° C. with decomposition.

*Example 17.—1'-carbamylmethyl-3-ethyl-oxa-4'-carbocyanine iodide*

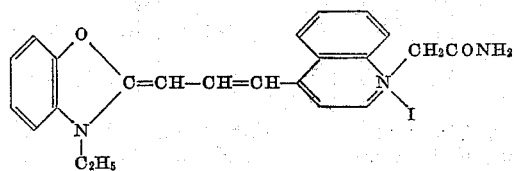

1-carbamylmethyllepidinium iodide (1.64 g.), 2-β-acetanilidovinylbenzoxazole ethiodide (2.17 g.) and triethylamine (0.51 g.) were dissolved in absolute ethyl alcohol (30 cc.). The reaction mixture was heated under reflux for 15 minutes and then chilled. The crude dye was filtered off, washed with water and acetone and recrystallized twice from methyl alcohol. Yield 0.73 g., 30%; M. P. 277–8° C. with decomposition.

*Example 18.—1'-carbamylmethyl-3-ethyl-thia-4'-carbocyanine iodide*

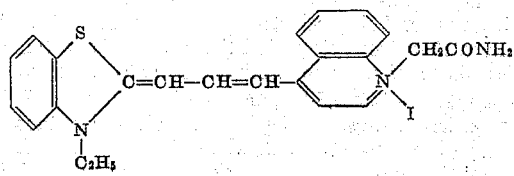

1-carbamylmethyllepidinium iodide (1.64 g.), 2-β-acetanilidovinylbenzothiazole ethiodide (2.25 g.) and triethylamine (0.51 g.) were dissolved in ethyl alcohol (30 cc.). The reaction mixture was heated under reflux for 15 minutes and then chilled. The crude dye was filtered off, washed with water and acetone and twice recrystallized from methyl alcohol. Yield 0.72 g., 53%; M. P. 293–4° C. with decomposition.

All of the dyes of our invention are particularly useful in manufacturing photographic, silver halide emulsions, serving to alter the sensitivity thereof. Sensitization by means of our new dye is, of course, directed primarily to the ordinarily employed, gelatino-silver-halide, developing-out emulsions. The dyes are advantageously incorporated in the washed, finished emulsion and should, of course, be uniformly distributed throughout the emulsion. In the preparation of photographic emulsions containing our new dyes, it is only necessary to disperse the dyes in the emulsions. The methods of incorporating dyes in emulsion are simple and well known to those skilled in the art of emulsion making. It is convenient to add the dyes from solutions in appropriate solvents. The solvent must, of course, be compatible with the emulsion and substantially free from any deleterious effect on the light-sensitive materials. Methanol has proven satisfactory as a solvent for the majority of our new dyes.

The concentration of our new dyes in the emulsion can vary widely, i. e., from about 5 to about 100 mgs. per liter of flowable emulsion. The concentration of the dye will vary according to the type of light-sensitive material in the emulsion and according to the effects desired. The suitable and most economical concentration for any given emulsion will be apparent to those skilled in the art upon making the ordinary tests and observations customarily used in the art of emulsion making.

To prepare a gelatino-silver-halide emulsion sensitized with one of our new dyes, the following procedure is satisfactory: A quantity of the dye is dissolved in methyl alcohol or other suitable solvent and a volume of this solution (which may be diluted with water) containing from 5 to 100 mgs. of dye is slowly added to about 1000 cc. of a gelatino-silver-halide emulsion, with stirring. Stirring is continued until the dye is uniformly distributed throughout the emulsion. With most of our new dyes, 10 to 20 mgs. of dye per liter of emulsion suffices to produce the maximum sensitizing effect with the ordinary gelatino-silver-bromide (including bromiodide) emulsions. With fine-grain emulsions, which include most of the ordinarily employed gelatino-silver-chloride emulsions, somewhat larger concentrations of dye may be necessary to secure the optimum sensitizing effect.

The above statements are only illustrative and are not to be understood as limiting our invention in any sense, as it will be apparent that our new dyes can be incorporated by other methods in many of the photographic silver halide emulsions customarily employed in the art. For instance, the dyes can be incorporated by bathing a plate or film upon which an emulsion has been coated, in the solution of the dye, in an appropriate solvent. Bathing methods, however, are not to be preferred ordinarily.

Photographic silver halide emulsions which can advantageously be sensitized by means of the new dyes of our invention comprise the customarily employed gelatino-silver-chloride, gelatino-silver-chlorobromide, gelatino-silver bromide, and gelatino-silver-bromiodide developing-out emulsions.

Photographic silver halide emulsions, such as those listed above, containing the sensitizing dyes of our invention can also contain such addenda as chemical sensitizers, e. g., sulfur sensitizers (e. g., allyl thiocarbamide, thiourea, allylisothiocyanate, cystine, etc.), various gold compounds (e. g., potassium chloroaurate, auric trichloride, etc.) (see U. S. Patents 2,540,085; 2,597,856 and 2,597,915), various palladium compounds, such as palladium chloride (U. S. 2,540,086), potassium chloropalladate (U. S. 2,598,079), etc., or mixtures of such sensitizers; antifoggants, such as ammonium chloroplatinate (U. S. 2,566,245), ammonium chloroplatinite (U. S. 2,566,263), benzotriazole, nitrobenzimidazole, 5-nitroindazole, benzidine, mercaptans, etc. (see Mees—

"The Theory of the Photographic Process," MacMillan Pub., 1942, page 460), or mixtures thereof; hardeners such as formaldehyde (U. S. 1,763,533), chrome alum (U. S. 1,763,533), glyoxal (U. S. 1,870,354), dibromacrolein (Br. 406,750), etc.; color couplers, such as those described in U. S. Patent 2,423,730, Spence and Carroll U. S. application Ser. No. 771,380, filed August 29, 1947, (now U. S. Patent 2,640,776) etc.; or mixtures of such addenda. Dispersing agents for color couplers, such as those set forth in U. S. Patents 2,322,027 and 2,304,940, can also be employed in the above-described emulsions.

What we claim as our invention and desire secured by Letters Patent of the United States is:

1. A compound selected from those represented by the following general formula:

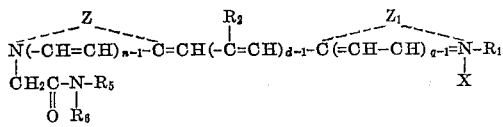

wherein $R_1$ represents an alkyl group containing from 1 to 7 carbon atoms, $R_2$, $R_5$ and $R_6$ each represents a member selected from the group consisting of a hydrogen atom and a lower alkyl group, X represents an acid radical $d$, $n$, and $q$ each represents a positive integer of from 1 to 2, and Z and $Z_1$ each represents the non-metallic atoms necessary to complete a heterocyclic nucleus, said heterocyclic nucleus being selected from the group consisting of those of the thiazole series, those of the benzothiazole series, those of the naphthothiazole series, of those of the thianaphtheno-7',6',4,5-thiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 1-isoquinoline series, those of the 3-isoquinoline series, those of the 3,3-dialkylindolenine series, those of the 2-pyridine series and those of the 4-pyridine series.

2. A cyanine dye selected from those represented by the following general formula:

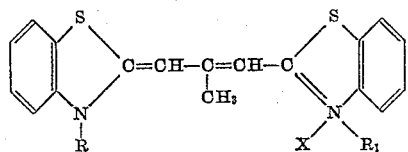

wherein R and $R_1$ each represents a di(lower alkyl) carbamylmethyl group and X represents an acid radical.

3. A cyanine dye selected from those represented by the following general formula:

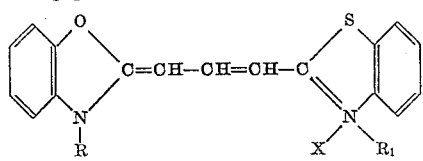

wherein R represents a lower alkyl group, $R_1$ represents a di(lower alkyl) carbamylmethyl group, and X represents an acid radical.

4. A cyanine dye selected from those represented by the following general formula:

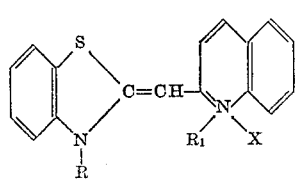

wherein R represents a di(lower alkyl) carbamylmethyl group, $R_1$ represents a lower alkyl group and X represents an acid radical.

5. The cyanine dye represented by the following formula:

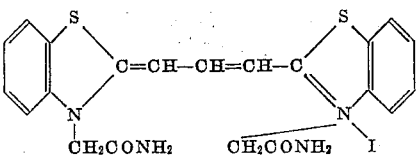

6. The cyanine dye represented by the following formula:

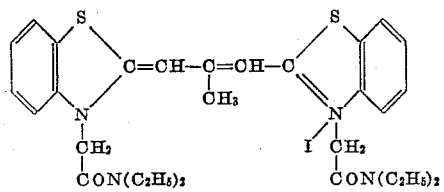

7. The cyanine dye represented by the following formula:

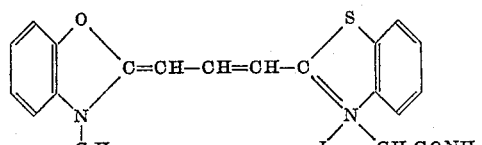

8. The cyanine dye represented by the following formula:

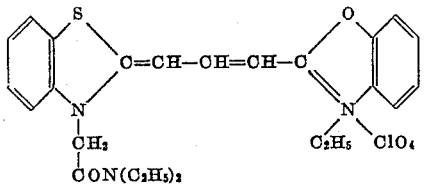

9. The cyanine dye represented by the following formula:

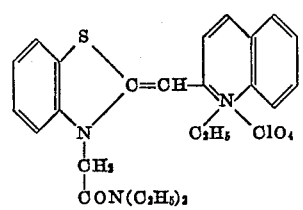

10. A process for preparing cyanine dyes comprising condensing a compound selected from those represented by the following general formula:

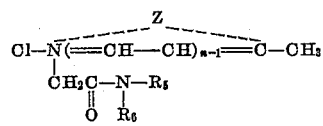

wherein $R_5$ and $R_6$ each represents a member selected from the group consisting of a hydrogen atom and a lower alkyl group, $n$ represents a positive integer of from 1 to 2, and Z represents the non-metallic atoms necessary to complete a heterocyclic nucleus, said heterocyclic nucleus being selected from the group consisting of those of the thiazole series, those of the benzothiazole series, those of the naphthothiazole series, those of the thianaphtheno-7',6',4,5-thiazole series, those of the oxazole series, those of the benzoxazole series, those of the naphthoxazole series, those of the selenazole series, those of the benzoselenazole series, those of the naphthoselenazole series, those of the thiazoline series, those of the 2-quinoline series, those of the 1-isoquinoline series, those of the 3-isoquinoline series, those of the 3,3-dialkylindolenine series, those of the 2-pyridine series and those of the 4-pyridine series, with a compound selected from those represented by the following general formula:

$(R'O)_3C-R_2$ wherein $R_2$ represents a member selected from the group consisting of a hydrogen atom and a lower alkyl group and $R'$ represents a lower alkyl group.

11. A process as defined in claim 10 wherein the condensation is carried out in the presence of an inert diluent.

12. A process as defined in claim 11 wherein the inert diluent is pyridine.

References Cited in the file of this patent

UNITED STATES PATENTS

| | | |
|---|---|---|
| 1,994,563 | Brooker | Mar. 19, 1935 |
| 1,994,658 | Brooker | Nov. 7, 1935 |
| 2,148,909 | Maier | Feb. 28, 1939 |
| 2,255,903 | Shonle | Sept. 16, 1941 |